United States Patent [19]

Gamble

[11] 4,082,393
[45] Apr. 4, 1978

[54] BUS DUCT ASSEMBLY

[75] Inventor: Dennis H. Gamble, Brighton Township, Beaver County, Pa.

[73] Assignee: Westinghouse Electric Corporation, Pittsburgh, Pa.

[21] Appl. No.: 763,201

[22] Filed: Jan. 27, 1977

[51] Int. Cl.² .............................................. H01R 3/06
[52] U.S. Cl. ................................. 339/14 R; 339/22 B; 339/258 P
[58] Field of Search .............. 339/14 R, 14 L, 14 P, 339/22 B, 154 R, 258 P

[56] References Cited
U.S. PATENT DOCUMENTS

| 2,997,685 | 8/1961 | Anderson | 339/22 B X |
| 3,448,203 | 6/1969 | Somes, Jr. | 339/22 B X |
| 3,497,860 | 2/1970 | Jorgensen et al. | 339/22 B X |

Primary Examiner—Roy Lake
Assistant Examiner—DeWalden W. Jones
Attorney, Agent, or Firm—L. P. Johns

[57] ABSTRACT

A bus duct assembly characterized by a bus duct section having top and bottom walls and opposite side walls forming a housing, a plurality of multi-phase bus bars supported within the housing, a ground bar within the housing and adjacent to one side wall and substantially coextensive with the housing, a retaining bracket mounted on the side wall and overlapping the ground bar, a tap box mounted on one of the side walls which overlaps the other and having a plurality of terminals connected respectively to the several bus bars, and a ground terminal within the tap box and connected to the ground bar.

3 Claims, 5 Drawing Figures

BUS DUCT ASSEMBLY

CROSS REFERENCE TO RELATED APPLICATIONS

This invention is related to the inventions disclosed in the applications of Dennis H. Gamble, Ser. No. 748,793, filed Dec. 9, 1976 and Ser. No. 763,202, filed Jan. 27, 1977.

BACKGROUND OF THE INVENTION

1. Field of the Invention

This invention relates to a bus duct assembly, and more particularly, it pertains to ground bar means associated therewith.

2. Description of the Prior Art

Bus duct assemblies of prior construction usually have not been provided with ground connecting means. When bus duct assemblies are installed with associated accessories such as plug-in power takeoff units and end cable tap box units, it has been necessary to provide ground means of a makeshift nature.

SUMMARY OF THE INVENTION

It has been found in accordance with this invention that the foregoing problem may be overcome by providing a bus duct assembly comprising a bus duct section having top and bottom walls and opposite side walls forming a housing, a plurality of multi-phase bus bars supported within the housing, a ground bar within the housing and adjacent to one side wall and substantially coextensive with the housing, means for retaining the ground bar in place against the side wall, the means comprising a pair of spaced inturned ribs in the side wall, the ground bar being located between the ribs, one of the top and bottom walls overextending the other wall at one end thereof, a tap box mounted on the overextended wall, a plurality of terminals within the box and connected respectively to the bus bars, and a ground terminal within the tap box and connected to the ground bar.

The advantage of the device of this invention is that it provides a built-in means for grounding not only adjacent bus duct sections but also attachments thereto, such as plug-in power takeoff units and end cable tap boxes by which power is connected to the bus duct system.

DESCRIPTION OF THE PREFERRED EMBODIMENT

Figure 1:
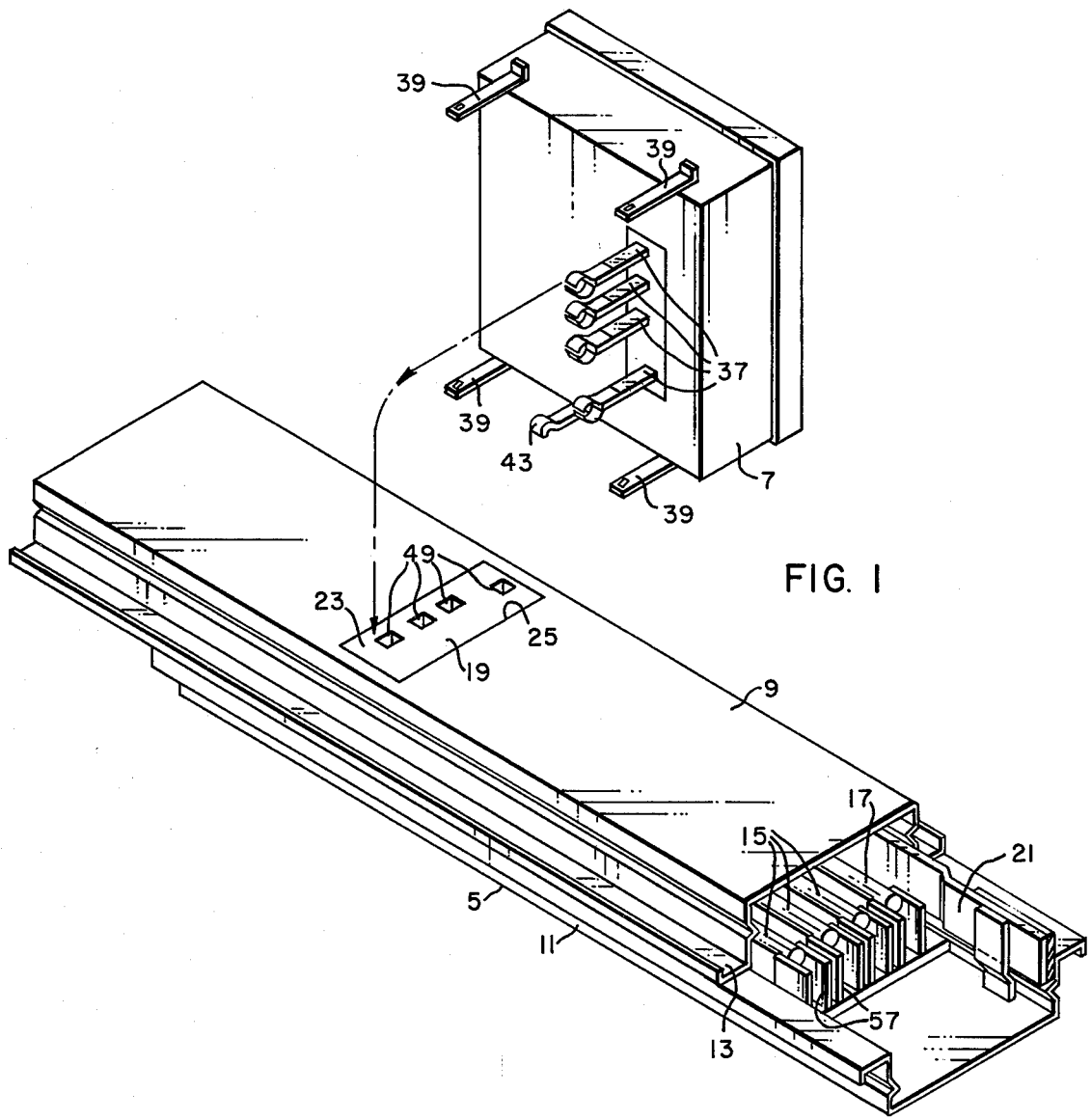
FIG. 1 is an isometric view of a bus duct section and showing a plug-in power takeoff unit positioned for placement on the bus duct section.

In FIG. 1, a portion of a bus duct system of electrical power distribution comprises a section 5 of a bus duct and a plug-in power takeoff unit 7 adapted to tap off power of the bus duct. The bus duct section 5 comprises a housing including a generally U-shaped sheet metal upper part 9 and a similar lower part 11. The parts 9 and 11 are connected together at flange portions 13 at each of two opposite sides thereof. Three phase-carrying bus bars 15 and a neutral bar 17 are supported within the housing in a generally parallel relationship by means of an insulating bus support member of a plug-in type generally indicated at 19. In addition, a ground bar 21 is mounted along one side of the housing.

Figure 2:
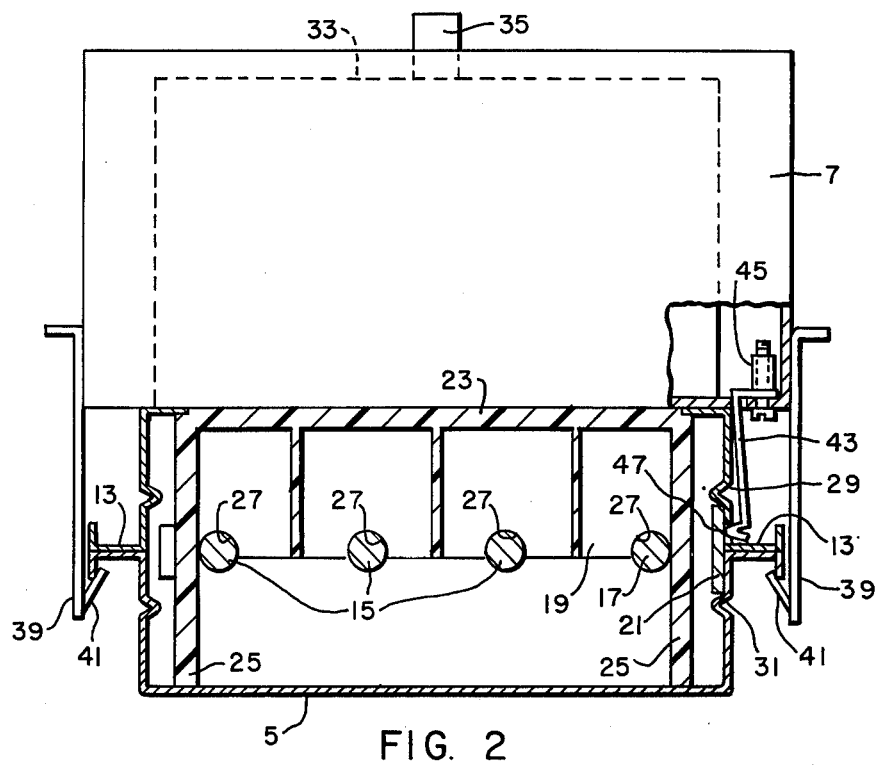
FIG. 2 is a vertical sectional view taken on the line 2—2 of FIG. 1 and showing the plug-in unit mounted on the bus duct.

As shown in FIG. 2, the bus support member 19 includes an upper surface 23 which extends through an opening 25 in the upper part 9. This support member 19 includes four corner legs 25 (two shown). In addition, the member 19 includes four grooves 27 in which the bus bars and neutral bar 15, 17 are disposed. The support member 19 also supports the ground bar 21 in place between a pair of longitudinal reinforcing ribs 29, 31 in the upper and lower parts 9 and 11, respectively.

As shown in FIGS. 1 and 2, the plug-in unit 7 serves as a housing for a three-pole circuit breaker generally indicated at 33 and having a manual handle 35. The circuit breaker 33 is suitably supported on the base of the plug-in unit 7 and is electrically connected to the bus bars and neutral bar 15, 17 by similar current conducting clip-on members 37.

The plug-in unit 7 is secured in place by a number of mounting brackets 39, each of which comprises an inturned ear 41 which engage the flange portions 13 on opposite sides of the bus duct section 5. Moreover, the plug-in unit 7 comprises a ground conductor 43, the upper end of which is secured and is connected to a ground terminal 45 in the plug-in unit 7, and the lower end of which extends through an opening 47 in the upper part 9 of the housing and contacts the ground bar 21.

Several members 37 pass through openings 49 in the bus support member 19 and are clipped on the bus bars 27 in a manner similar to that shown in U.S. Pat. No. 3,213,405.

Figure 3:
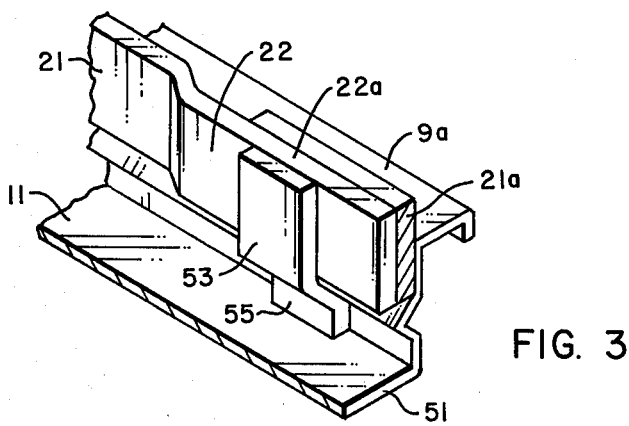
FIG. 3 is an enlarged fragmentary isometric view showing the manner in which overlapping bus bars of adjacent bus duct sections are secured together.

As shown in FIG. 3, the ground bar 21 of the bus duct section 9 includes an offset portion 22 within the end of the bus duct 9, which portion overlaps at 22a the end portion of a ground bar 21a of an adjacent bus duct section 9a. The overlapping portions of the ground bars 22, 21a are retained in good electrical contact by a joint clip 53 which is secured at 55 in a suitable manner, such as a rivet, to the side wall of the lower part 11 of the bus duct section. The joint clip 53 is biased against the side wall in order to hold the overlapping portions of the ground bars tightly together.

As shown more particularly in FIG. 1, the upper part 9 of the bus duct section 5 extends beyond the left end of the lower part 11 of the bus duct section. Similarly, the lower part 11 extends beyond the right end of the upper part 9 by a distance substantially equal to the overlap at the other end. Thus, the corresponding bus duct sections 5 may be assembled together with corresponding bus bars 15 and neutral bar 17 being secured together in alignment by opposed pairs of mounting clips 57 mounted in the lower part of the bus duct section.

Figure 5:
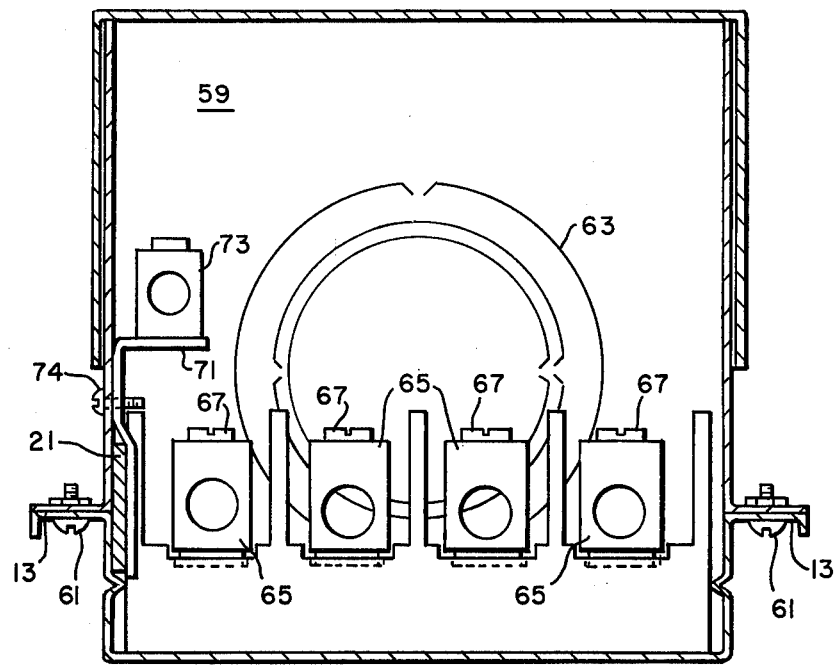
FIG. 5 is a vertical sectional view taken on the line 4—4 of FIG. 4.
Figure 4:
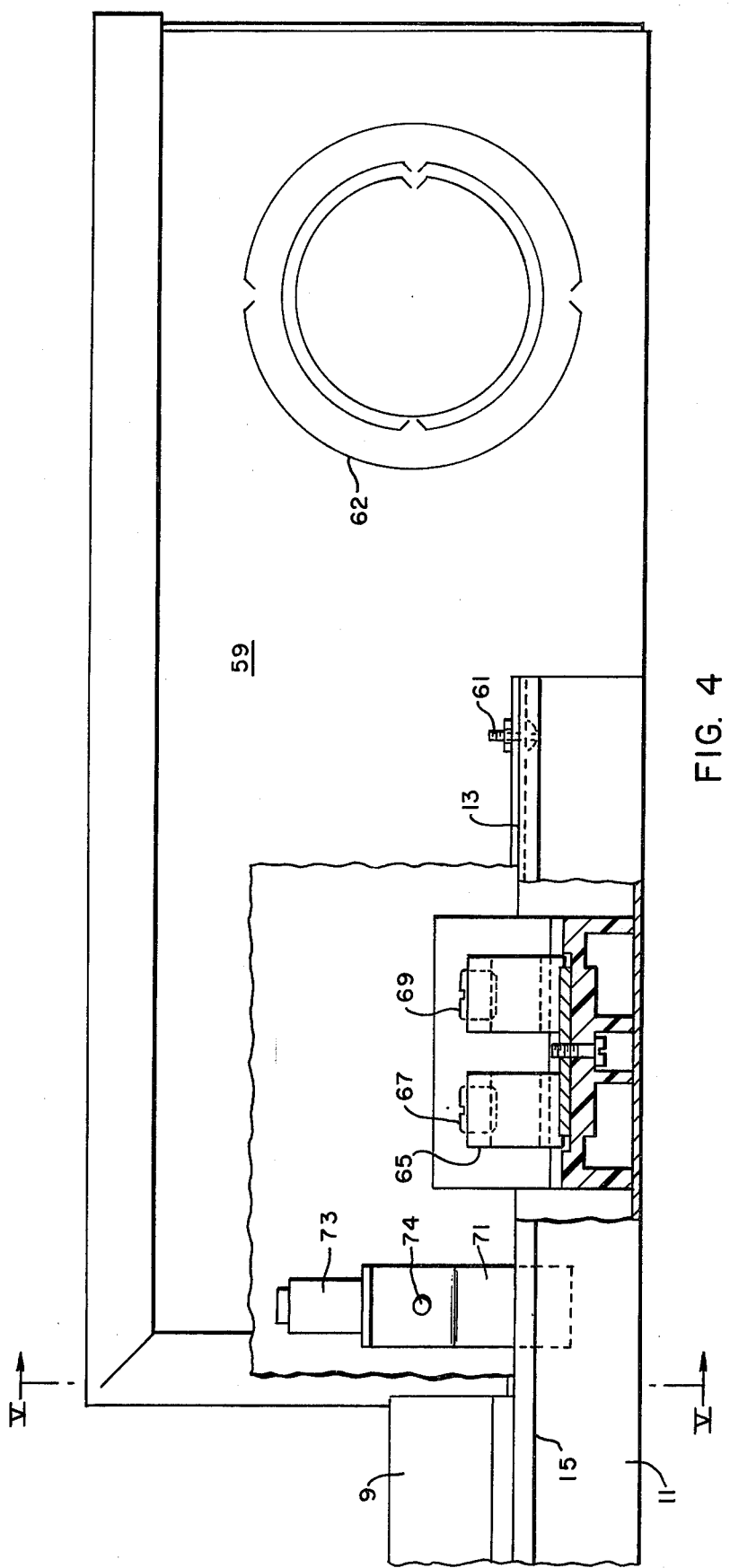
FIG. 4 is an elevational view with a portion broken away showing the manner in which an end cable tap box is attached to the end bus duct section of an assembly of such section.

Inasmuch as each bus duct system is connected to a supply cable, a cable tap box 59 is mounted on the end of an endmost section of a bus duct system. The cable tap box 59 is adapted to engage the overlapping portion of the bus duct lower part 11 and is secured in place by spaced screws 61 which extend through the flange portions 13. The tap box 59 is a sheet metal box-like container having an opening adapted to fit over the overlap portion of the lower part 11 of the bus duct section and completely enclose the overlap portion as shown in FIG. 4. The tap box 59 includes knock-out portions 62, 63 (FIGS. 4 and 5) in at least two different walls of the cable tap box 59.

Within the box 59 are a plurality, preferably four, terminals 65 to which the end portions of the bus bars and neutral bar 15, 17 are secured by setscrews 67. The opposite ends of the several terminals 65 are likewise provided with setscrews 69 for securing the ends of suitable electric supply cables in place in the terminals.

In addition, ground conductor means including a ground connector 71 and a terminal 73 are provided. The connector 71 overlaps an end portion of the ground bar 21 and is tightened by screw 74 that passes through a side of tap box 59 into tapped hole in ground connector 71, making good electrical contact. The terminal 73 being mounted on the upper end of the ground connector 71 is secured to a suitable ground connector (not shown) associated either with the supply cable or other suitable grounding means.

In conclusion, the device of this invention provides grounding means including an integral ground bar within each bus duct section and mounting clips for securing ground bars of adjacent bus duct sections together. The device also provides an end cable tap box by which the duct system is connected to a suitable supply cable with associated grounding means.

What is claimed is:

1. A bus duct assembly comprising a bus duct section having top and bottom walls and opposite side walls forming a housing, a plurality of multi-phase bus bars supported within the housing, a ground bar within the housing and adjacent to one side wall and substantially coextensive with the housing, means for retaining the ground bar in place against the side wall comprising a pair of reinforcement inturned ribs in said side wall, the ground bar being located between the ribs, the ground bar comprising an offset end portion, and a retaining bracket secured on said wall and overlapping the offset end portion for holding an end portion of a ground bar of an adjacent bus duct between the offset end portion and the side wall of the bus duct.

2. The assembly of claim 1 in which one of the top and bottom walls overextends the other wall thereof, a tap box is mounted on one of the overextended walls, a plurality of terminals within the box and connected respectively to the bus bars, and a ground terminal within the tap box and connected to the ground bar.

3. The assembly of claim 2 in which the plurality of bus bars extends beyond said other wall, the tap box enclosing the bus bars, and the plurality of terminals being mounted on the end portions of the respective bus bars.

* * * * *